F. H. RIGGS.
PLIERS.
APPLICATION FILED OCT. 23, 1915.
1,170,334.
Patented Feb. 1, 1916.
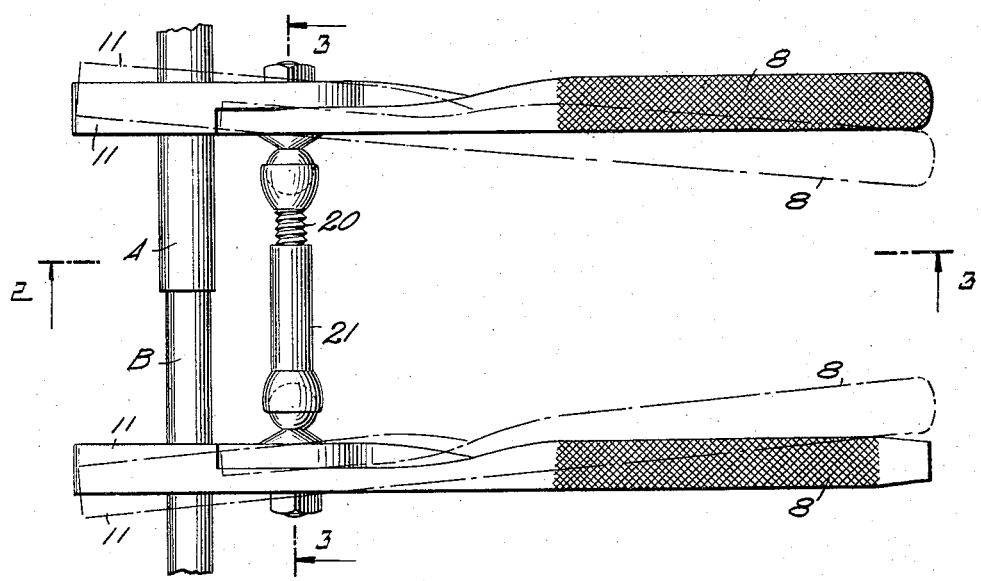
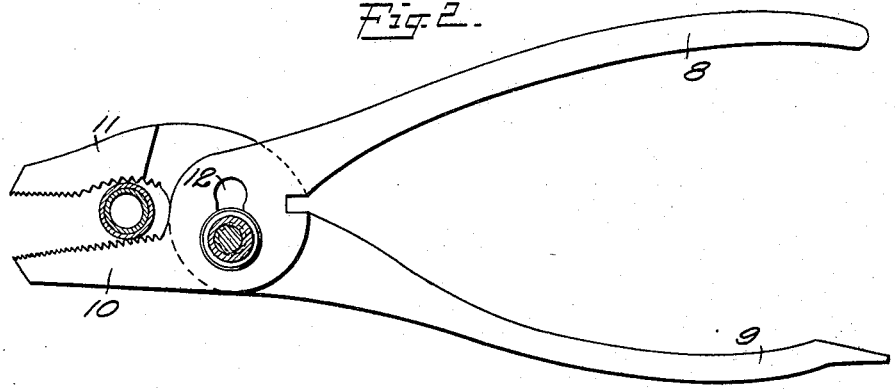
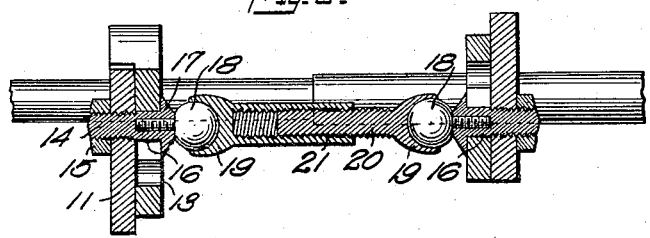
WITNESSES
George L. Blume.
INVENTOR
F. H. Riggs
BY
ATTORNEYS

UNITED STATES PATENT OFFICE.

FRANK HENRY RIGGS, OF ROCHESTER, NEW YORK.

PLIERS.

1,170,334.  Specification of Letters Patent.  Patented Feb. 1, 1916.

Application filed October 23, 1915. Serial No. 57,477.

*To all whom it may concern:*

Be it known that I, FRANK H. RIGGS, a citizen of the United States, and a resident of Rochester, in the county of Monroe and State of New York, have invented a new and Improved Pliers, of which the following is a full, clear, and exact description.

Among the principal objects which the present invention has in view are: to provide a tool for drawing the ends of wire or similar articles together; to provide hand-operated pliers disposed in paired arrangement adapted for contracting or expanding the ends of articles gripped thereby; and to provide means for expanding and contracting the interval between individual pliers.

*Drawings.*—Figure 1 is a top plan view showing pliers arranged and constructed in conformity with the present invention, and in conjunction therewith sections of tubes held in the jaws of the pliers for relative movement thereof; Fig. 2 is a section taken as on the line 2—2 in Fig. 1; Fig. 3 is a section taken as on the line 3—3 in Fig. 1.

*Description.*—As seen in the drawings, the pliers have hand grips 8 and 9, carrying jaws 10 and 11, respectively. The hand grips and jaws mentioned are of conventional form and construction, wherein the jaw 10 is provided with a pivot slot having enlarged pivot ends 12 and 13, and the jaw 11 has fixedly mounted thereon an elliptical pin for extension through said slot and for pivotal connection with the ends 12 and 13.

In the present invention, a substitute for the elliptical pin above mentioned, is provided in the shape of screws 14, fixedly mounted in the jaw 11 by being screwed therein, a nut 15 holding each of said screws rigidly in position. The shanks 16 are elliptical in form to pass through the slot connecting the pivot ends 12 and 13 in the same manner as the pivot used in the conventional form of pliers.

The flanged head 17 of each of the screws has integrally formed thereon a ball 18, which balls are provided to engage the cupped ends 19 of the screw 20 and sleeve 21, which form the connecting structure between the pliers, as shown best in Fig. 3 of the drawings. To provide for expanding and contracting the space between the pliers and the jaws 10 and 11 thereof, the screw 20 and the sleeve 21 are correspondingly threaded to engage.

*Operation.*—Having a tool constructed and arranged as above described and as shown in the accompanying drawings, it is operated as follows: If the problem be to draw together or separate the ends of tubes A, B, the pliers are first adjusted to expand or contract the opening of the jaws 10 and 11 in each case. It will be noted that the opening of the said jaws in the two pairs of pliers may vary. This having been satisfactorily effected, the screw 20 and sleeve 21 are manipulated to expand or contract the combined extension thereof. When the proper working distance has been arranged for the pliers, the operator opens the jaws 10 and 11 of each pair of pliers and therewith grasps the ends of the tubes A and B.

If the problem be to separate the ends of the tubes A and B, the operator grasping tightly the hand grips 8 and 9, moves the same toward each other and in the direction as indicated by the broken lines in Fig. 1 of the drawings. Each pair of pliers fulcrums on the ball 18 connected with it, the same rocking in the cupped ends 19 formed in the screw 20 and sleeve 21. Sufficient force is thus easily and steadily applied on the tubes A and B to separate them. If the problem be the reverse of that stated, the operation is also reversed.

It is obvious that if the articles to be operated upon are not in the same plane, each pair of pliers may be independently turned on its ball 18, so that the operating angle of the jaws of each pliers may differ from the operating angle of the jaws of the other pliers. In this way, one pair of pliers may constitute an anchorage or brace for fulcruming the other pair of pliers when employed for moving another article.

Claims:

1. A tool as characterized comprising a plurality of hand-gripped pliers; and means holding said pliers in spaced relation, said means embodying telescopic members, each forming with one of said pliers a ball-and-socket joint.

2. A tool as characterized comprising a plurality of hand-gripped pliers; means holding said pliers in spaced relation, said means embodying telescopic members, each forming with one of said pliers a ball-and-socket joint; and means for expanding and contracting the length of said members, said means embodying a screw and a threaded sleeve.

3. A tool as characterized comprising a plurality of hand-gripped pliers having pivotally connected members; pivots for said members having each a ball formed at one end thereof and laterally extended from said pliers; and a spreading member having sockets at the ends thereof for engaging said balls for forming a flexible joint therewith.

4. A tool as characterized comprising a plurality of hand-gripped pliers having pivotally connected members; pivots for said members having each a ball formed at one end thereof and laterally extended from said pliers; said spreading member consisting on the one side of a feed screw and on the other side of an internally threaded sleeve for engaging said screw.

FRANK HENRY RIGGS.

Witnesses:
 GEO. E. WATSON,
 FRED. G. SWEET.